UNITED STATES PATENT OFFICE.

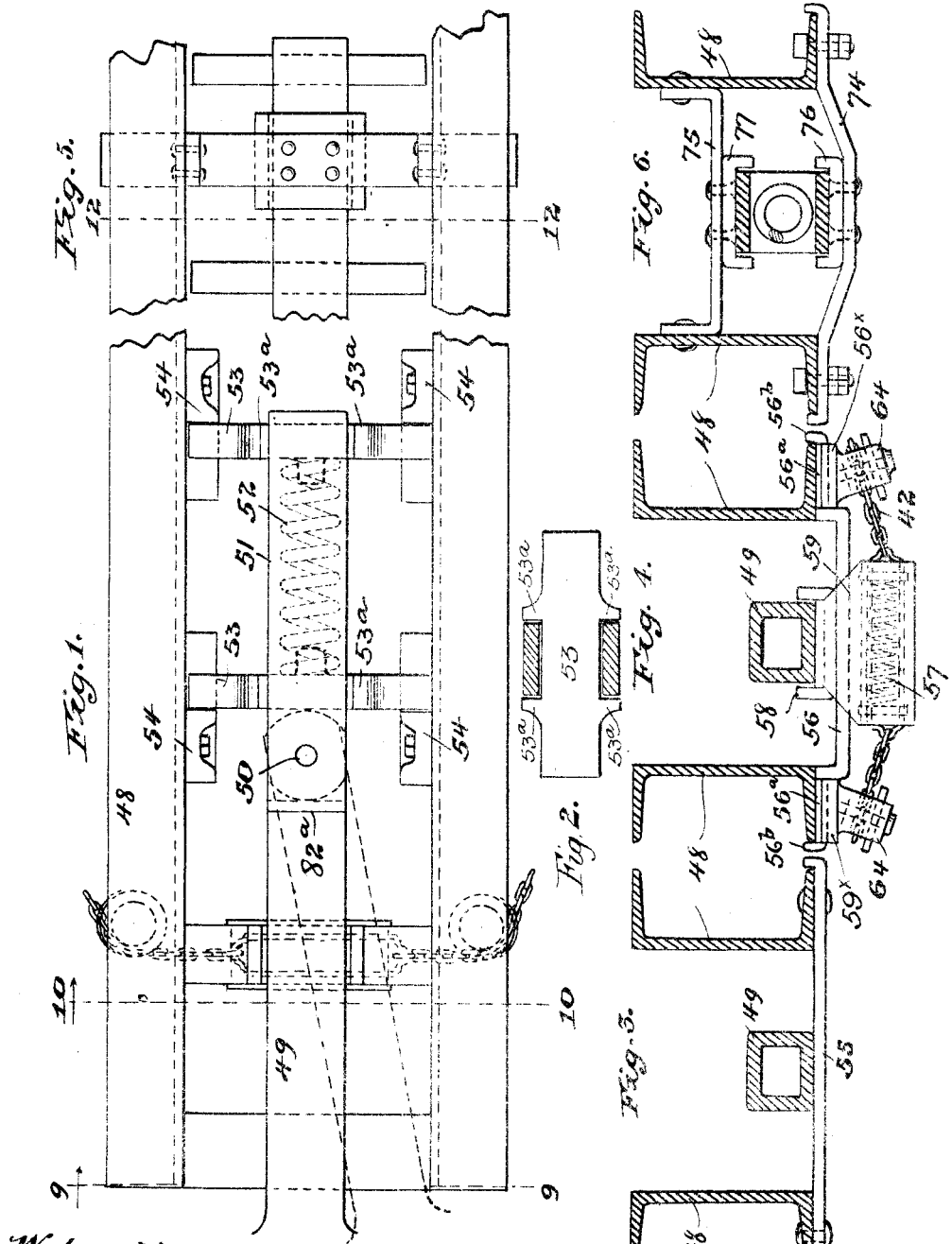

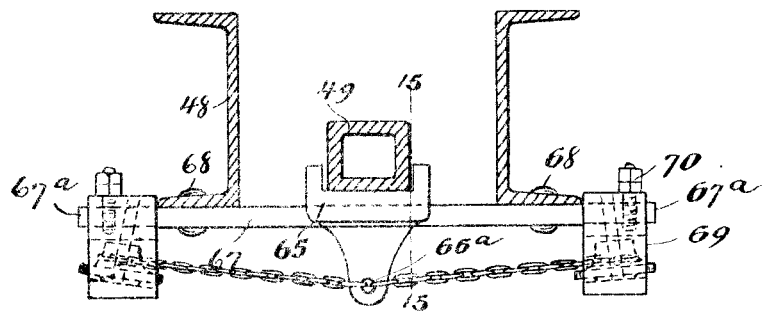
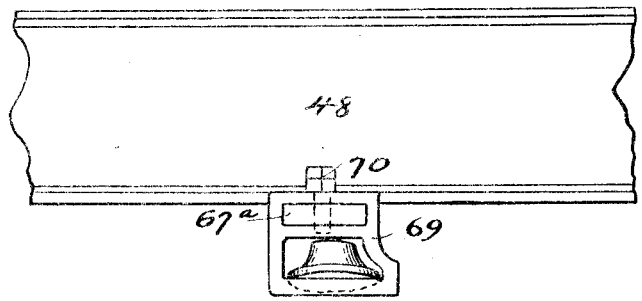
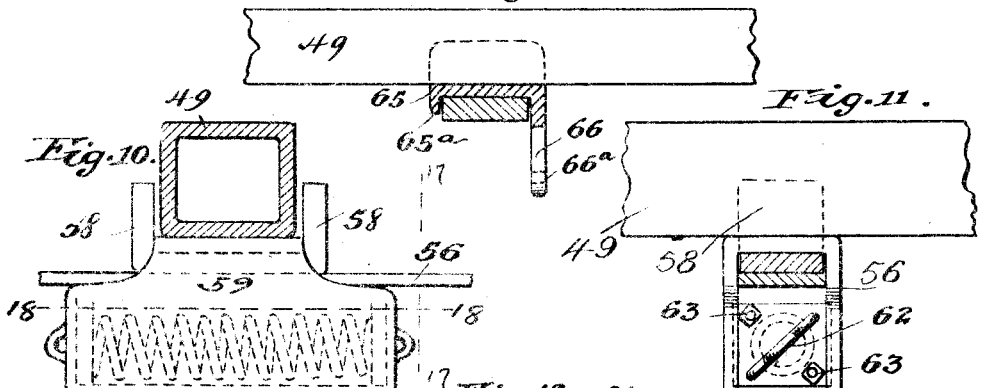
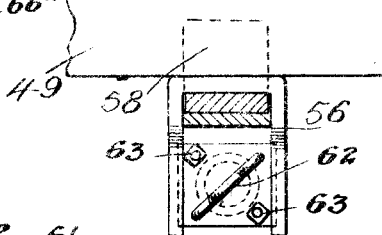
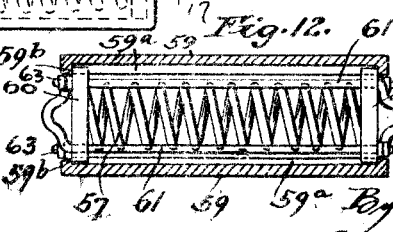

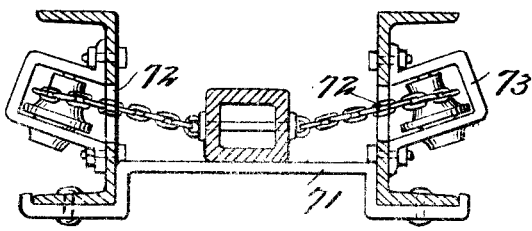
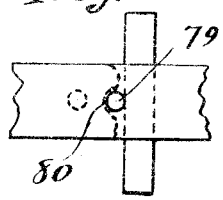
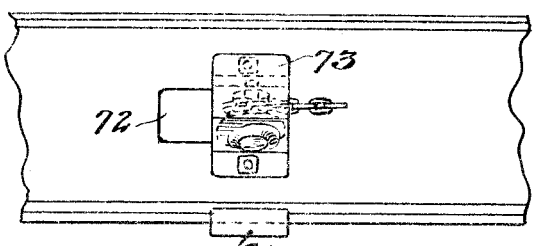
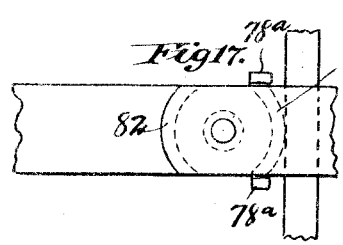
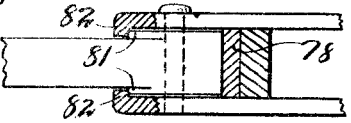
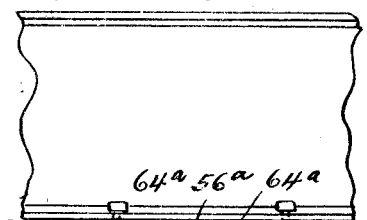
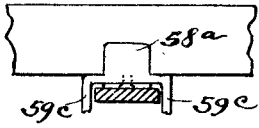

GEORGE H. FORSYTH, OF CHICAGO, ILLINOIS, ASSIGNOR, BY MESNE ASSIGNMENTS, TO WAUGH DRAFT GEAR COMPANY, A CORPORATION OF ILLINOIS.

DRAFT-RIGGING MECHANISM.

1,137,961.   Specification of Letters Patent.   Patented May 4, 1915.

Application filed February 23, 1904. Serial No. 194,889.

*To all whom it may concern:*

Be it known that I, GEORGE H. FORSYTH, a citizen of the United States, residing at Chicago, in the county of Cook and State of Illinois, have invented certain new and useful Improvements in Draft-Rigging Mechanism, of which the following is a specification.

My invention relates to draft rigging mechanism for railway cars; and in the principal embodiments thereof contemplated by me pertains to that class or type of draft rigging mechanism wherein an angularly movable draw-bar is provided with truck-actuated means for controlling the sidewise movement of the draw-bar, the object being to maintain the draw-bar in a favorable position for coupling on all kinds of track, whether straight or curved.

Heretofore it has been the practice in railway cars, particularly freight cars, to allow but a very limited and insufficient amount of side clearance to the draw-bars for the purpose of going around curves. Recently, however, it has become evident, especially with the tendency to employ cars of greater length, to substantially increase the amount of side clearance allowed the draw-bars of cars in order that they may, when passing over curved as well as straight portions of track, be permitted to assume a position substantially coincident with the line of draft instead of pulling at an angle to each other. While this increased side clearance with the consequent freedom of angular movement that it allows the draw-bar has been eminently satisfactory under strains of draft, it has brought about correspondingly greater danger of injury to the draw-bars and the cars under buffing shocks; for it must be evident that with the greater freedom of side movement, the draw-bars under shocks of buffing might be thrust with a correspondingly greater violence to one side and assume even a sharper angle than was formerly possible when they were held substantially rigid laterally. In order to avoid the danger of the draw-bars acting toward each other like the members of a hinge under the shocks of buffing I have provided in my invention a means whereby not only are the draw-bars prevented from thus forming with each other a more acute angle than they have hitherto done when lying substantially on the longitudinal centers of their respective cars; but they are maintained in substantially the same relative position to each other during buffing as under draft.

Another object of the invention is to provide a new and improved means for automatically throwing the draw-bar to a position coincident with the line of draft whenever a relative angular movement takes place between the truck and the car-body.

A minor object of the invention is to provide a novel draw-bar controlling means which shall have the additional function of partially supporting the weight of the draw-bar and to that extent lessening friction and wear between the draw-bar and the usual hanger or other support.

Still other minor objects having in view the improved forms and relative arrangements of operating parts more particularly pertaining to the draw-bar controlling mechanism will appear later in connection with the subjoined description of the embodiment of the invention shown in the accompanying drawings, wherein,—

Figure 1 is a top plan view of a form of draft rigging mechanism embodying the principle of my invention wherein the draw-bar is pivoted to the front end of the draft rigging proper, and the mechanism is applied between channel-bar center-sills; Fig. 2 is a front elevational view of one of the followers illustrating means incorporated therewith for preventing lateral movement of the draft rigging; Figs. 3 and 4 are cross-sectional views on the lines 9—9 and 10—10, respectively, of Fig. 1, viewed in the directions indicated by the arrows; Fig. 5 is a broken detail view illustrating a modified means for guiding the yoke of the draft rigging; Fig. 6 is a cross-sectional view on the line 12—12 of Fig. 6; Fig. 7 is an end view illustrating a modification of the draw-bar controlling mechanism; Fig. 8 is a fragmentary side elevational view of the parts shown in Fig. 7; Fig. 9 is a detail cross-sectional view on the line 15—15 of Fig. 7; Fig. 10 is a front elevational view of a preferred form of draw-bar saddle having associated therewith means for rendering the truck connection extensible in both directions; Fig. 11 is a side elevational view partly in cross-section taken on the line 17—17 of Fig. 10; Fig. 12 is a horizontal sectional view on the line 18—18 of Fig. 10; Fig. 13 is a cross-sectional view similar to Fig. 4, illustrating the mechanism employed where the guides for the draw-bar actuating chains are located on the sides of the center-sills; Fig. 14 is a side elevational view of Fig. 13; Fig. 15 is a side elevational view of the parts shown in Fig. 4 but with a slight modification of the means for preventing endwise movement of the hanger; Fig. 16 illustrates the formation of the end portion of the hanger employed in the construction illustrated in Fig. 15; Fig. 17 is a detail plan view showing a wear-plate between the end of the pivoted draw-bar and the front follower of the draft rigging; Fig. 18 is a longitudinal sectional view through Fig. 17 with the draw-bar shown in side elevation; Fig. 19 is a view similar to Fig. 17 showing an anti-friction member substituted for the wear-plate; Fig. 20 is a detail view of the draw-bar showing a pivoted saddle and hanger engaging guide coöperating therewith; and Fig. 21 is a bottom plan view of the parts shown in Fig. 20.

My improved draw-bar controlling mechanism which, in its preferred and theoretically perfect form, is designed to impart to the draw-bar a sidewise swing wherever there occurs a relative angular movement between the truck and the car-body, as on curves of varying degrees of curvature and as on passing from straight to curved track and vice versa, so as to not merely maintain the draw-bar constantly at right angles to the truck-bolster but to give it an angular lead over such a position so as to maintain it coincident with the line of draft, may be seen in one of its forms in Figs. 1 to 3, wherein the draw-bar is located between metal beams and is capable of a relative angular movement to the draft rigging. The channel-beams are shown at 48, the draw-bar at 49, the same being pivoted at 50 to the front end of the draft rigging, which may comprise the usual yoke 51, spring 52, followers 53 and the follower-stops 54. When employing this construction, I preferably provide between the front transverse support 55 for the draw-bar and its pivotal connection to the draft rigging an intermediate or auxiliary support consisting of a hanger 56; and on this hanger I preferably mount the intermediate draw-bar guiding or engaging elements of the draw-bar controlling mechanism.

In the form of this mechanism illustrated in Figs. 4, 10, 11, and 12, I employ an extensionable member in the nature of a spring 57 which coöperates with the chains to effect the lateral swing of the draw-bar through the following mechanism: 58 is a U-shaped saddle seated on the hanger 56, having vertically-extending parts lying on either side of the draw-bar respectively. On the bottom of the saddle is hung a casing having parallel depending side walls 59, the inner faces of which are cut out to provide guideways 59ª and end shoulders 59ᵇ, for a pair of followers 60. Each of the followers is apertured at its four corners, as shown in Fig. 11, and through one pair of diagonally-opposite holes of each follower is passed a U-shaped rod 61 connected at one end outside of the follower by a clevis 62, and at the other end passing through the corresponding holes in the other follower and terminating in nuts 63. Between the rods and followers thus assembled is disposed the spring 57, and to each of the clevises 62 is connected the adjacent end of the chain 42. The draw-bar 49 lies directly on the upper horizontal part of the spring casing. It will thus be seen that the spring 57 furnishes the required extensibility of the flexible connection between the draw-bar and the truck when the draw-bar is swung to either side of its normal or central position. It will also be evident that when the draw-bar is swung laterally through the instrumentality of the chains 42 there will be a tendency to raise the side walls 59 and through them the draw-bar 49, thereby lessening the friction between the saddle 58 and the hanger 56. When employing this construction the brackets 64 carrying the guide-pulleys may be secured to the under side of the lower flanges of the channels, and may be provided with openings 56ˣ to accommodate the end portions 56ª of the hanger 56, whereby the latter are supported and confined by the brackets. The extremities of the end portions of the hanger may be bent upwardly, as shown at 56ᵇ, against the edges of the channel-beam flanges to prevent endwise movement of the hanger. An alternative of this latter construction, as shown in Figs. 15 and 16, may consist in making the end portions 56ª of the hanger slightly narrower than the intermediate portion, thereby providing on either side thereof shoulders 56ᶜ which abut against vertical members 64ª of the pulley-bracket that confine edgewise the end portion 56ª of the hanger.

Where it is not desired to employ the single spring extensionable device last described, a draw-bar engaging saddle alone may be used, such as is shown at 65 in Figs. 7 and 9, in which case the saddle will have on one end thereof a depending lip 65ª overlying one edge of the hanger, and a depending arm 66 overlying the other edge containing an eye 66ª to which the chains 42 may be attached. This construction of draw-bar guide is herein illustrated in connection with a straight hanger 67 fastened directly to the lower flanges of the channel-beams, as shown at 68, and having projecting end portions 67ª adapted to receive pulley-brackets 69 which may be confined thereon by set-screws 70.

Where the draw-bar is located higher up between the beams the pulley-supporting brackets may be located on the outer sides of said beams, the latter being apertured to permit the passage of the chains therethrough. Such a construction is illustrated in Figs. 13 and 14, wherein the draw-bar rests upon an upwardly-offset transverse support 71 fastened to the lower flanges of the beams, and the latter are apertured preferably with longitudinal slots, as shown at 72, opposite which apertures are secured to the outer sides of the beams inclined pulley-brackets 73 so located as to bring the chain-engaging surface of the pulleys in a plane above the plane of the attachments to the draw-bar in order to increase the lifting effect already imparted by the peculiar contour of the face of the pulley upon the draw-bar hereinabove referred to.

Where the draw-bar is pivoted to the front end of the draft rigging, it becomes advisable to provide lateral guides for the latter to prevent undue sidewise swing and movement of the draft rigging along with the draw-bar. The simplest, cheapest and preferred means for accomplishing this consists in the provision of vertical lugs shown at 53ª on the upper and lower edges of the followers 53, see Figs. 1 and 2, these lugs serving to loosely confine the upper and lower sections of the yoke against lateral movement. As a mechanical equivalent for the latter, however, I may employ the construction illustrated in Figs. 5 and 6, wherein an additional hanger 74 is applied to the lower flanges of the beams substantially centrally beneath the draft rigging, with a transverse bar 75 also secured between the inner faces of the sills above the draft rigging and preferably in the same vertical plane as the hanger 74. Inversely disposed U-shaped guides 76 and 77 are secured to the upper and lower faces of the parts 74 and 75, respectively, these guides confining the upper and lower sections of the yoke in the manner clearly shown in Fig. 6.

Where the draw-bar is pivoted to the front end of the yoke, as in the preferred form of my invention illustrated in Fig. 1, it is desirable to provide means for withstanding the wear occasioned by the rub of the inner end of the draw-bar in its swinging movements and also to relieve as far as possible the pivot-pin from the strains of buffing and draft imparted therethrough. For the former purpose I insert between the rounded end of the draw-bar and the front face of the front follower a curved wear-plate 78, shown in Figs. 17 and 18, which wear-plate may be made of hardened steel or similar wear-resisting material, and which will have upper and lower lugs 78ª at its ends engaging the sides of the yoke to hold it practically rigid with the yoke and prevent lateral displacement thereof. Instead of such a wear-plate I may insert between the end of the draw-bar and the front face of the follower a vertically-disposed roller 79 (Fig. 19) which roller may be confined against lateral displacement by a concave seat 80 therefor formed in the rounded or convexed end of the draw-bar. For the purpose of relieving the pivot-pin to some extent of the transverse strain, I preferably form the inner end of the draw-bar of increased height so as to provide for the formation of rounded shoulders 81 (Fig. 18) thereon, which shoulders are engaged by inwardly-extending flanges on the inner end of the yoke. These flanges may be made rounded to fit the rounded shoulders 81 throughout, as shown at 82 in Figs. 17 and 18, or they may be made straight, as shown at 82ª in Fig. 1; the latter form being cheaper and easier to make.

Figs. 20 and 21 illustrate a slight modification of the draw-bar guide mechanism shown in Figs. 10 and 11 adapted to facilitate the angular movement of the draw-bar consistently with the linear transverse travel of the draw-bar guide on its supporting hanger. By reference to these figures, which are respectively side elevational and bottom plan views of the parts immediately engaging the draw-bar and the hanger, it will be seen that the U-shaped member 58ª has its vertical lugs engaging the sides of the draw-bar, while its horizontal or transverse member is provided with rounded or convexed edges 58ᵇ, outside of which latter lie the upper portions of the depending casing plates 59ᶜ. The horizontal intermediate plates of these members may or may not be pivotally connected by a pivot-pin 83. This construction permits the required angular swing of the immediate draw-bar engaging member 58ª with the draw-bar while at the same time transmitting to the hanger-engaging member 59ᶜ a travel over the hanger as the draw-bar swings laterally, with a minimum of friction and wear between the parts.

While I have shown my invention as applied to a draft rigging mechanism in which the resistance medium is supplied by a single spring, it must be evident that my invention is equally applicable to any suitable construction of draft rigging mechanism no matter what be the nature of the resistance medium therefor, whether same consists of a plurality of springs, spring-plates, friction elements or other suitable component members.

The means which I have shown for accomplishing the hereinabove described control of the draw-bar is supported by the car-body and actuated by the truck; but I desire it to be clearly understood that I do not limit my invention to these features of construction and operation nor to the particular mechanism hereinabove shown and described except to the extent indicated in specific claims.

Wherever in the following claims the term "draw-bar" occurs, it should be understood that the same is used in contradistinction to the remaining features of the draft-rigging.

I claim:

1. In a draft mechanism, the combination of a draft gear, a draw bar pivoted to the draft gear, and a connection between the truck and the draw bar in advance of the gear and serving to impart to the draw bar an angular movement to maintain the same substantially in the line of draft on a curve.

2. In a draft mechanism, the combination of a draft gear, means to hold the same against a lateral movement, a draw bar pivoted to the draft gear and means connecting the truck and draft bar in advance of the pivot to maintain the draw bar in the line of draft on a curve.

3. In a draft mechanism, the combination of a draft gear, means to hold the same against a lateral movement, a draw bar pivoted to the draft gear, and means connected to the truck and to the draw bar in advance of the pivot and serving to impart to the draw bar independent of the gear an increased angular movement relative to the car body over the angular movement occurring between the latter and the truck.

4. In a draft mechanism, the combination of a draft gear, means to hold the same against lateral movement, a draw bar pivoted to the draft gear, and means connected to the truck and to the draw bar in advance of the pivot and serving to impart to the draw bar independent of the gear an increased angular movement relative to the car body over the angular movement occurring between the latter and the truck, said connection exerting a lifting action on the draw bar.

5. In a draft mechanism, the combination of a draft gear, means to hold the same against lateral movement, a draw bar pivoted to the draft gear, and a yielding flexible connection between the truck and the draw bar in advance of the pivot, said connection serving to impart to the draw bar an increased angular movement relative to the car body over angular movement occurring between the latter and the truck.

GEORGE H. FORSYTH.

Witnesses:
    FREDERICK C. GOODWIN,
    W. R. LITZENBERG.